(12) United States Patent
Le Buhan

(10) Patent No.: US 10,902,139 B2
(45) Date of Patent: Jan. 26, 2021

(54) METHOD TO TRACK THE DISSEMINATION OF A DATA SET

(71) Applicant: NAGRAVISION S.A., Cheseaux-sur-Lausanne (CH)

(72) Inventor: Corinne Le Buhan, Les Paccots (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 247 days.

(21) Appl. No.: 15/776,363

(22) PCT Filed: Nov. 29, 2016

(86) PCT No.: PCT/EP2016/079147
§ 371 (c)(1),
(2) Date: May 15, 2018

(87) PCT Pub. No.: WO2017/093258
PCT Pub. Date: Jun. 8, 2017

(65) Prior Publication Data
US 2020/0202025 A1 Jun. 25, 2020

(30) Foreign Application Priority Data
Nov. 30, 2015 (EP) .................................. 15196921

(51) Int. Cl.
*G06F 21/60* (2013.01)
*G06F 21/62* (2013.01)
(Continued)

(52) U.S. Cl.
CPC ...... *G06F 21/6218* (2013.01); *G06F 16/2264* (2019.01); *G06F 16/9024* (2019.01);
(Continued)

(58) Field of Classification Search
CPC ............ G06F 21/6218; G06F 16/2264; G06F 16/9024; G06F 21/60; G06F 21/62; G06F 21/10; G06F 16/22; G06F 16/901
See application file for complete search history.

(56) References Cited

U.S. PATENT DOCUMENTS

| 9,613,190 B2 * | 4/2017 | Ford ........................ G06F 21/62 |
| 2009/0164387 A1 * | 6/2009 | Armstrong ............. G06Q 40/04 705/36 R |

(Continued)

FOREIGN PATENT DOCUMENTS

EP    0715247 A1    6/1996

OTHER PUBLICATIONS

International Search Report and Written for related PCT application No. PCT/EP2016/079147, dated Feb. 13, 2017, in 12 pages.

(Continued)

*Primary Examiner* — Jayesh M Jhaveri
(74) *Attorney, Agent, or Firm* — Oblon, McClelland, Maier & Neustadt, L.L.P.

(57) ABSTRACT

The present invention concerns the field of data dissemination tracking, in particular aims at keeping track of the various devices in which a given data was used. It is proposed a method to track the dissemination of a first data set carried out by a first tracking server (CS1), a first device and a second device, said data set comprising a data management section and a data payload, said data management section comprising a data identifier and data usage information defining a security conformance level, said method comprising the steps of:—receiving by the first tricking server (CS1) from the first device (d0), a first device identification and at least a data management section of a first set of data, said data management section comprising at (Continued)

least a security conformance level and a first data identifier,—identifying or creating in the database, a current graph data set corresponding to the first data identifier, said current graph data set comprising a common section, edges and nodes,—storing in the current graph data set, said first data management section in the common section and said first identifier as a first node,—receiving by the first tracking server (CS1) a request to transfer the first data set from the first device to the second device, said request comprising at least a second device identification of the second device and the first data identifier,—retrieving by the first tracking server (CS1) second device security conformance level, based on the second device identification,—verifying by the first tracking server (CS1) that the second device security conformance level meets the security conformance level of the first data set as identifier by the first data identifier,—in the positive event, responding by granting authorisation to the transfer at least the data payload of the first data set to the second device,—recording in tire database, in respect with the current graph data set, the second device identifier as a second graph data node,—recording in the database, in respect with the current graph data set, a transaction from the first device to second device as an edge in the current graph data set linking the first graph node and the second graph node.

19 Claims, 3 Drawing Sheets

(51) Int. Cl.
 *G06F 21/10* (2013.01)
 *G06F 16/22* (2019.01)
 *G06F 16/901* (2019.01)
(52) U.S. Cl.
 CPC .............. *G06F 21/60* (2013.01); *G06F 21/62* (2013.01); *G06F 21/6209* (2013.01)

(56) References Cited

U.S. PATENT DOCUMENTS

| | | | |
|---|---|---|---|
| 2010/0205254 A1 | 8/2010 | Ham | |
| 2010/0257204 A1* | 10/2010 | Orlov | G06F 21/6218 707/783 |
| 2012/0066493 A1* | 3/2012 | Widergren | H04L 63/0428 713/160 |
| 2015/0163206 A1* | 6/2015 | McCarthy | G06F 21/10 713/171 |
| 2015/0249669 A1 | 9/2015 | Gamage | |
| 2015/0310188 A1* | 10/2015 | Ford | H04L 63/0428 726/28 |
| 2016/0148006 A1* | 5/2016 | Ganapathi | G06F 21/6263 726/30 |

OTHER PUBLICATIONS

Extended European Search Report for related EP application No. 15196921.9, dated May 13, 2016, in 9 pages.

\* cited by examiner

METHOD TO TRACK THE DISSEMINATION OF A DATA SET

INTRODUCTION

The present invention concerns the field of data dissemination tracking, in particular aims at keeping track of the various devices in which a given data was used.

BACKGROUND ART

The known approach to control the dissemination of data is to rely on a server that stores the data and controls the transmission of the data to a target device. The service of a social network is a good illustration of this scheme. The originator posts a picture on the server and the dissemination of this picture (or any other media such as video, audio or text) is subject to rules enforced by the server. This approach is primarily server-centric. In a number of emerging applications, such as cybersecurity data monitoring or data privacy enforcement, there is a need for a finer grain monitoring of data usage (both data storage, temporary or persistent, and data processing) as the data is been accessed, used or stored through different networks and devices.

Modern networking technologies have raised new confidentiality breaches threats, as sensitive information flows through a diversity of networks. Corporate security enforcement relies today on access control, both physical and virtual, in combination with encryption and authentication solutions such as for instance VPN and PGP solutions for document management systems and email communications.

These solutions remain primarily user-centric and to some extent device-centric (e.g. secure printer access) or project-centric (e.g. data room access limited to a few users) but they are not well adapted to the increasing openness of business practices: "Bring Your Own Device" (BYOD) extended connectivity, collaboration networks/open innovation between value creators not necessarily under strict corporate control, e.g. in the academic world, and the development of cost-optimized outsourcing practices for IT, legal and financial services, possibly overseas. A known solution, e.g. the server centric solution, is based on a server, collecting and storing the data to be traced, and keeping track of all devices requesting a copy of these data.

There is therefore a need for solutions to containerize sensitive data access at the lowest possible information level, by switching from usage-centric access control (to which data, from which user, from which device) to data-centric access control (from which data, to which user, to which device). Some cybersecurity monitoring systems are based on the surveillance of massive data information exchange patterns, e.g. for insider intrusion detection, an alerts can be raised based on the establishment of unusual data communication networks. For instance, in "Towards a Networks-of-Networks Framework for Cyber Security», 2013 IEEE International Conference on_Intelligence and Security Informatics (ISI), 4-7 Jun. 2013, p. 106-108, Halappanavar describes a Network of Networks graph modeling of a cybersecurity monitoring environment in a SCADA critical infrastructure application. However, this approach is limited to the a posteriori detection of threats, while there is a need for better solutions also at enforcement level for a priori prevention of the threats.

BRIEF DESCRIPTION

The proposed solution is based on at least one server having a database to store information about the transmission path of a data set. One main aspect is the fact that the data set does not need necessarily to be stored in the server. The tracking server is in charge of following the transfer of the data set to the various devices. For that purpose, the tracking server should keep informed of any move of the data set, either by the current recipient of the data set or the new device willing to obtain the data set.

A data set may comprise a first part which is the data payload, the data payload representing the content in any format, such as ASCII text, or binary data such audio, image, video, executable code, compressed data, encrypted data, etc. The data set also contains a data management section which comprises at least an identification of the data set and data usage information defining the criteria to access the data payload. The identification of the data set may further comprise information about the data format type, size, etc. The data usage information may further comprise information about the security or privacy level requirement for the data set, as a conformance level. For instance, in a corporate environment, a marketing brochure, a confidential commercial agreement and a payroll file may be subject to different conformance levels with different usage rules.

In the frame of the present invention, it is proposed a method to track the dissemination of a first data set carried out by a first tracking server (CS1), a first device and a second device, said data set comprising at least a data management section and a data payload, said data management section comprising at least a data identifier and data usage information defining at least a security conformance level, said method comprising the steps of:

receiving by the first tracking server (CS1) from the first device (d0), a first device local data and at least a data management section of a first set of data, said data management section comprising at least a security conformance level and a first data identifier, identifying or creating in the database, a current graph data set corresponding to the first data identifier, said current graph data set comprising a common section, edges and nodes, storing in the current graph data set, said first data management section in the common section and said first identifier as a first node, receiving by the first tracking server (CS1) a request to transfer the first data set from the first device to the second device, said request comprising at least a second device local data of the second device and the first data identifier, retrieving by the first tracking server (CS1) second device security conformance level, based on the second device local data, verifying by the first tracking server (CS1) that the second device security conformance level meets the security conformance level of the first data set as identifier by the first data identifier, in the positive event, responding by granting authorisation to the transfer at least the data payload of the first data set to the second device, recording in the database, in respect with the current graph data set, the second device identifier as a second graph data node One particularity of the present invention is to store the transaction in a current graph data set, each node representing one device having accessed to the data set, each edge representing a transaction. The device may be a memory unit, a processing unit, a network router unit, a display unit, a printing unit, a loudspeaker unit, etc. The edge link between two nodes can represent the type of transaction between the two devices of the two nodes.

In a possible embodiment, in the database of the server, one data set identified by a data identifier may be tracked via a graph data set, each defining an originator device, a recipient device, and a transaction type. The graph data set comprises a common section to store data related to the data set common to all devices, nodes to store one device having at some stage accessed the data set, and edges defining the transaction between two devices. The node can comprise at least one device identifier and can further comprise additional data such as the time and date when the data set was obtained by the device, a device name, device user name, a device location, a device set of users (e.g. a corporate user group of users taking part in a meeting, for data displayed on a beamer screen). The transaction type may also record the way the recipient has received access to the data set. Examples of transaction types are as follows:

transmission of the data payload from originator to recipient, i.e. push action retrieval by the recipient to the originator of the data payload, i.e. pull action, transmission of the data payload via an email or any type or message sent to the recipient, transmission via Bluetooth, USB, NFC, transmission via a third party server (e.g. Dropbox™)

The transaction type may also further record the way the data set has been transmitted. It may identify a data format (e.g. word, powerpoint, PDF . . . ), a data transmission mode (synchronous or asynchronous, underlying communication protocols and standards for instance, USB, Bluetooth, wifi, ethernet, etc . . . ), an encryption mode, and/or an authentication mode, the technical communication media (USB, Cloud, Bluetooth). Other embodiments are also possible.

BRIEF DESCRIPTION OF THE FIGURES

The present invention will be better understood thanks to the attached figures, in which.

DETAILED DESCRIPTION

The system of the invention provides a solution to track the distribution of a data set and to have a clear picture of which devices and routes have been involved in this distribution. The system is based on at least one central server or tracking server comprising a database, the server database storing the path of a data set in a graph format as illustrated in the FIG. 1. In this figure, the device D0 is considered the initiator of the data set or the entry point in the graph representation controlled by the server CS1.

Figure 1:
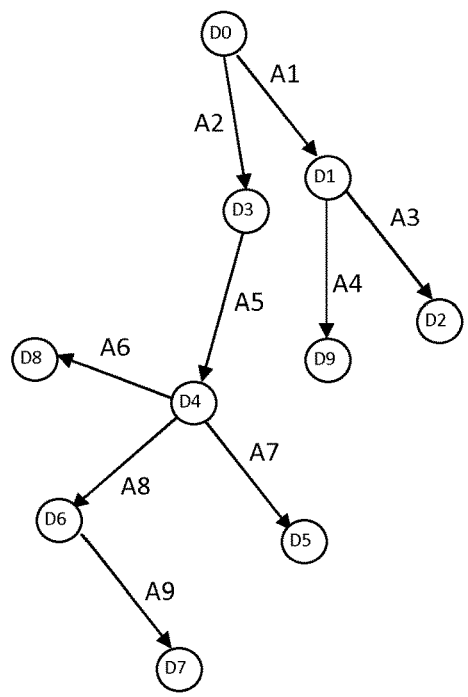
FIG. 1 illustrates a graph showing the path of a data set.

The data set may be first created or imported into the server CS1 security conformance domain by the device D0. According to the representation of the FIG. 1, the device D0 holds the data set meaning that the device D0 stores the data set in its memory under its security control. The task of the tracking server is to record the movement of the data set and record each participant having access to the data set. The FIG. 1 represents the dissemination of one data set and all devices involved in the transfer of the data set. Each time that another device has access to the data set, the tracking server is informed allowing the later to update the graph. Is in then necessary that the devices represented in the FIG. 1 participate to the tracking by keeping the tracking server informed. This information can take various forms as for example illustrated in the FIG. 4. The tracking server has a first purpose which is to store the local data (such as the identification or the localisation) of the devices having access to the data set and another purpose is to grant or deny the access to the data set. This is why the data set is associated with security conformance level defining the conditions to grant or deny the access to the data set.

The security conformance level may comprise information about the security or privacy level requirement for the data set, such as a conformance level, in the form of a tag field or a XML description, referring to a reference security framework. Different reference security frameworks may also be referred to. Examples of security frameworks are the international common criteria certification standards and agreements (https://www.commoncriteriaportal.org/); in that context the data conformance level may require that it is only handled by devices certified at a minimum Common Criteria EAL security level. In some applications, a proprietary security framework may be referred to, for instance the security framework implemented in accordance with environments implementing obfuscation technologies.

In the case that the device local data is the geographic localisation, the conformance verification is made regarding geographic zones. When the second device request the transfer of the data set, second geographic localisation is compared to the authorized zones attached to the data set.

In a possible embodiment, secure environment is used, where access to the data is only possible by device D0 thanks to cryptographic protocols and/or tamper-proof designs as known by those skilled in the art of secure devices. A secure device overview, from firmware device and group keys and root certification to data protection in an app sandbox is disclosed for instance in the iOs Security Guide by Apple (https://www.apple.com/business/docs/iOS_Security_Guide.pdf—September 2015 version for iOS 9.0 or later). In recent Windows systems, the BitLocker security used to encrypt the hard-disk volume is built on top of the standard TPM (Trusted Platform Module) standard implemented in compliant PC hardware chips, as described for instance in http://www.cs.unh.edu/~t666/reading_list/Hardware/tpm_fundamentals.pdf. Depending on the actual implementation of the device, a certain security conformance level may be assigned to it.

By default, the data set may be associated with the same security conformance level, in particular for data automatically created by the device without user input, such as sensor data. Alternately, when the data was created by a user through a user interface on the device, for instance a document, the data security conformance level may be assigned by the user. Other embodiments are also possible, for instance the data security conformance level may be assigned automatically by an application based on application settings formerly defined by the user, so that she does not need to bother with manual conformance level settings each time a new data set is created. For instance on a corporate computer, by default any document created with the Microsoft Word application running on a TPM-compliant PC may be required to be encrypted when saved on the internal hard-disk.

The first step is the initialization of a data graph for a given data set, here for instance a new Word document created on a PC device D0. A data set comprises different sections having different purposes. A first section is the data payload which is the final data for which a tracking is to be carried out. The data payload can be a picture, a video, a document or any type of data owned by a user. A second section is the data management section comprising, at least, a data identifier and data usage information. The data identifier is a data used to identify the data payload. Example of data identifier:

the hash value of the payload the unique identifier of the originator of the data payload plus a sequence number a random number a date/time and position where the data was generated (for a picture for example)

a document location identifier, such as a file path or URL.

The identification of the data set may further comprise information about the data format type, size, etc. The data usage information may further comprise information about the security or privacy level requirement for the data set, as a conformance level. The conformance level information may identify the minimum conditions to access the data payload, such as requirements for the recipient device description (e.g. minimum required security level), the recipient user rights (e.g. member of a group) or the recipient application capability (e.g. minimum required version, dedicated plug-in . . . ).

As already explained, this data set may be generated by the device D0 based on certain device security rules. Alternately, the data set may be imported by the device D0 from a different domain. For instance, a sensitive document may be sent by Company A to Company B under a confidentiality agreement relationship, by email using secure communication means; for instance the PGP protocol may be used. The mail server receiving the communication from the external internet will then act as device D0, creating a new data set where the data identifier uniquely identifies the email received by the server, the data payload is the encrypted email and the data usage information indicates that this data is subject to a security conformance level at least equivalent to that required from an external incoming PGP secure communication. Thus, regardless of whether the device D0 has created or imported the data, the device D0 is the first device participating in the data tracking as far as the server CS1 is concerned, as described in the present document.

At the time of generating the data set, either new data or imported data set from an external domain, the device D0 sends a request to the server CS1 to track the propagation of the data set. This request comprises at least the data management section of the data set and a data identifier. The server CS1 then creates a new graph data set in its graph database for this new data, using the data identifier to uniquely identify the graph data set. This will be the current graph data set. Optionally, the server can check if this data set is already known using the data identifier. In case that an existing graph data is identified, rather than creating a new graph, the graph data set (i.e. the current graph data set) for this data set is updated accordingly.

The current graph data set is identified by the server by the data identifier, and the originator, in our case the device D0, is a root node of the graph. The graph database, as an example of realization, can comprise a set of triplets to represent the graph, the triplet comprising the originator, the recipient (both being a node of the graph) and a transaction type (which represent an edge of the graph). A triplet is created each time a successful transaction is carried out. The server can comprise a representation module to generate a map of the dissemination of the data set. In case that the local data of the devices are the geographic localisation, the representation module can generate a geographical dissemination map of the data set representing the nodes and the edges according to the localisation of the devices.

The next step is the request to transfer the data set from the first device D0 to a second device D1. This request can originate from the requestor device which could be the first device, the second device or by a third party (e.g. a service provider). In the latter embodiment, a third party such as a control device, through which the data payload does not need to be transferred, may request the transfer of the full data set from the first device to the second device. One example of such a process is a backup controller in a network of slave devices connected to a single backup appliance. For instance in the SCADA architecture, the SCADA master device may require the transfer of certain monitoring information from a series of SCADA remote client devices to a cybersecurity monitoring equipment in the main SCADA Security Operation Center. The requestor device inserts the data identifier and the first and second device local data (such as the identification or the localisation) into the request to the control server CS1.

According to another embodiment, the first and second device local data are the localisation data. On the first device, the localisation such as the GPS coordinates are known and transmitted to the control server CS1. In the same manner, the second device sends its localisation. The control server CS1 can therefore create a map of the geographic dissemination of the data set. For the rest of the description, "device local data" can be the identification data of the device or the localisation of the device, or both.

In a preferred embodiment, the control server CS1 maintains a list of all conformant devices in its domain, together with their security conformance level information. Thus, based on the second device identification data, the control server can identify the second device security conformance level and compare it with the security conformance level linked with the data set.

According to another embodiment, the request to the control server CS1 can contain the security conformance level of the second device.

With the data identifier, the server can locate the data set in its database and extract the data usage information. The server will then compare the second device data usage conformance level with the data usage information conformance level and determine if the second device meets the minimum criteria to authorize the transfer of the data set.

The server CS1, once the verification of the data usage information is successfully completed, replies to the requestor with an authorisation message.

The authorisation message could comprise a mere acknowledgment stating that the verification of the conformance level was successful. The requestor receives the confirmation that the second device is entitled to obtain the data set. In case that the requestor is the first device, the latter can then transmit the data set, or at least the data payload of the data set, to the second device.

In case that a third party is involved, such as a service provider SP storing the data set, the first device can communicate to the second device an address allowing the retrieval of the data. Preferably, the message sent to the second device contains an authorization to access the data set recognized by the service provider SP. This authorization can be in a form of a certificate (e.g. X509) containing the data identifier and the second device identification, signed by an authority known by the service provider. This certificate is controlled by the service provider and in case that the authenticity is confirmed, can transmit the data set to the second device. Other embodiment such as using a secure link containing a unique identifier (e.g. https.//servicepro-vider.com/data=H78Gt09Z3E) can be used. The first device also informs the control server CS1 that the data set is actually transferred from the service provider SP to the second device D1. The graph data set of this data set is updated to add a new node as the service provider SP and a transaction "SP" to "second device".

In this particular case, the graph data set contained already the transaction from the first device to the service provider SP, updated at the time the data set was transferred to the service provider. The graph data set will then further contain the transaction between the service provider SP to the second device D1.

In order to ensure its confidentiality, the sensitive data payload may be encrypted. Conventional VPN as well as PGP solutions rely upon a PKI infrastructure, which does not fit well into a heterogeneous graph of "networks of networks" (NoN) with multiple point-to-point edges at a lower access control segmentation than the corporate user access control. Alternate cryptographic architectures such as those based on broadcast encryption (similar to the 4C content protection standard), possibly attribute-based broadcast encryption (to deal with different levels of security rules), possibly also in combination with inherent traitor tracing capability, may also be considered.

In case that the first device grants authorization to access the data set to the second device, the first device can send the cryptographic material in order to allow the access to the data set.

For each data transfer authorization, the control server CS1 records in the graph related to this data set a node associated with the second device identifier and an edge associated with the transaction details. The transaction type, according to a first example, may include the identification (or the local data such as the localisation) of the $3^{rd}$ party requestor. In case that the requestor is the first device, the transaction type may be "push to the second device". In the same manner, if the second device is the requestor, the transaction type may be "pull from the first device.

The transaction type may also optionally include various parameter associated to the request as identified by the server CS1. An example of the transaction type can be a reference to the communication means used to transfer the data (e.g. Wifi, Bluetooth, USB . . . ) and associated secure communication protocols (E.g. IPSEC . . . ), as well as a date and time of the transaction.

Figure 2:
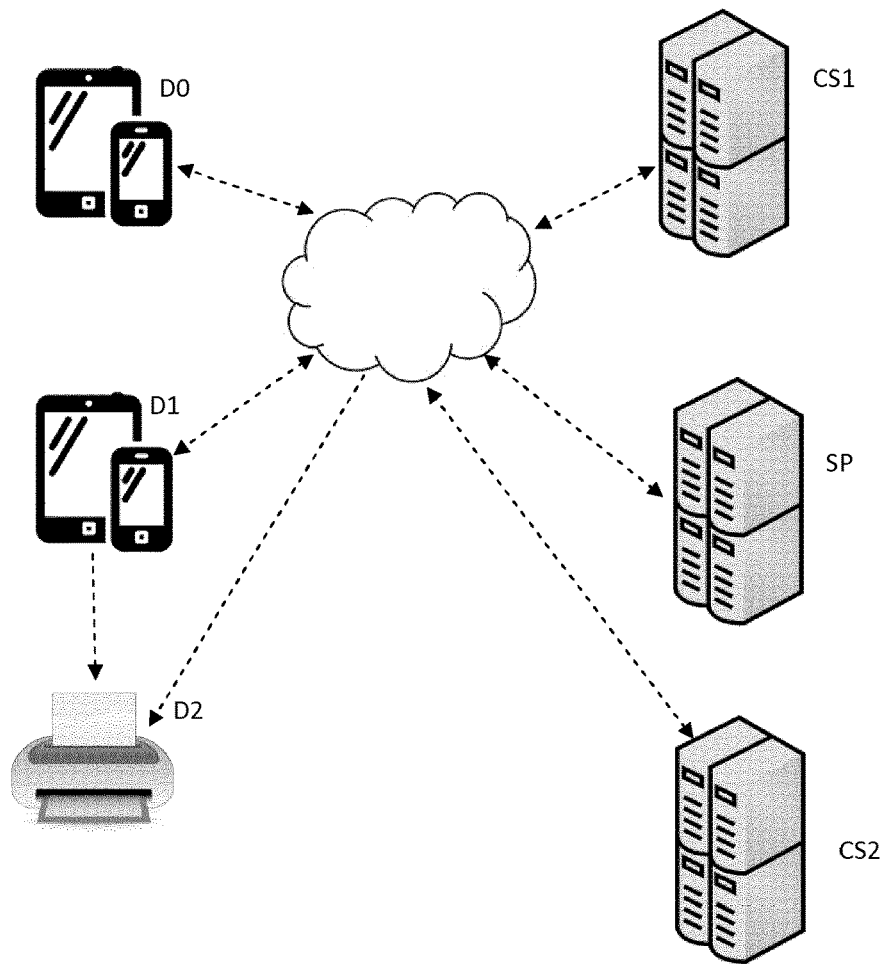
FIG. 2 illustrates the various devices of the system tracking the dissemination of a data set.
Figure 3:
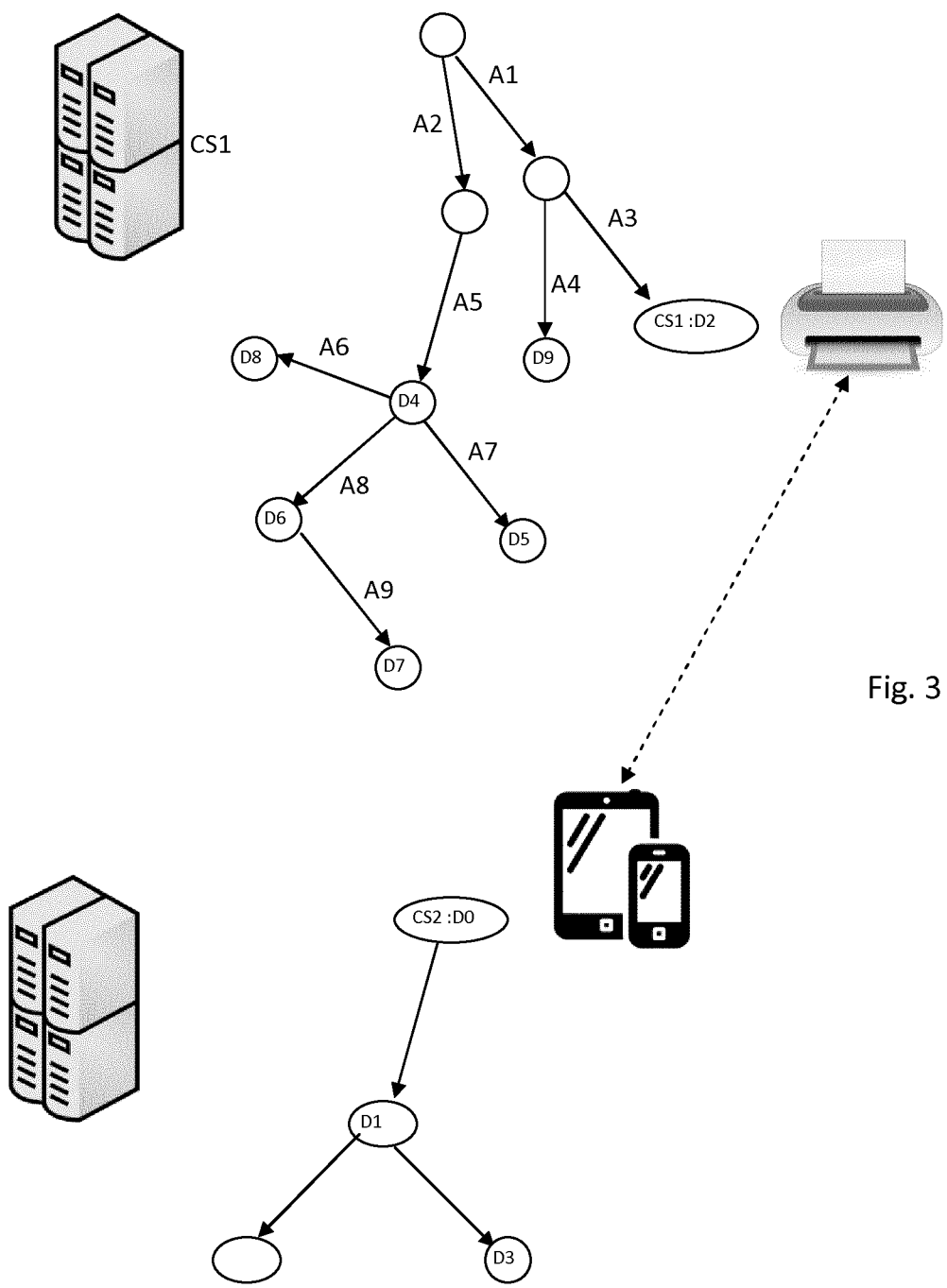
FIG. 3 illustrates the connection of two tracking servers.

The devices of the present invention, according to one embodiment, can have a particular application (a plug-in, or applet) loaded in their memory to handle the handshake with the server as well as the transfer of the data set. In another embodiment, a hardware plug-in, such as a smartcard or a USB dongle, may be used in association with the handshake software. The data set, in particular the data payload, is only processed by the applet. In the FIG. 2, one of the devices, the device D2 is a printer. The applet may be loaded into the printer software and each time that a data set is received, the device D2 (i.e. the printer) will request the authorization to the server CS1 to print the data set. The applet may comprise means to trace the content source D2 device once converted to a physical form. For instance a covert or overt fingerprint such as watermark may be inserted by the device D2 in a printed document. Similarly, an audio, image or video watermark may be inserted in the data by multimedia speakers, displays, or beamer devices According to an embodiment, as represented by FIG. 3, the graph of one set of data managed by a control server CS1 in a first security domain can be connected with another graph, handled by another control server CS2 in a second domain. The first server CS1 can be connected to a second server CS2 though various digital communication means, e.g. the internet for an email communication between two different companies domains, or through a physical form of the data, for instance a paper document printed by printer device CS1:D2 in the first server CS1 domain and imported by scanner device CS2:D0 in the second server CS2 security domain.

In a possible embodiment, some devices in the security domain managed by control server CS1 may be mobile, such as laptops, tablets, smartphones, or internet of things sensors. At some times, they are part of the security domain managed by control server CS1, for instance when they are connected through a corporate VPN secure network or under a local network supervision. At other times, they are out of the security domain but may still create some data and/or have access to formerly stored data sets in their secure memory. Therefore, an itinerant device D0 may further embed a local control server subCS1 in charge with managing the conformance of transactions while out of the CS1 main control server domain. To this end, as long as the local control server subCS1 is in connection with the main CS1 control server, it maintains a series of graph roots (single node graphs) corresponding to all data sets available on device D0. As long as the local control server subCS1 is out of connection from the main CS1 control server, it manages the graphs in an autonomous mode, by creating new nodes for newly generated data, and new edges and new nodes for new data set transfer transactions. When the local control server subCS1 and the main control server CS1 connect again, the local control server subCS1 reports its graph to the main control server CS1 which updates its main Graph-Guard database of graphs accordingly, by merging the local and the main graphs. The local control server subCS1 on device D0 may then retrieve the subset of the main graph as a series of graph roots (single node graphs) corresponding to all data sets available on device D0, so that it does not need to store the whole graph, which may not be possible on a single device D0 resources as the graph grows.

A user in charge with the sensitive data item security enforcement (e.g. the creator of the content) may configure a set of security rules for its further communications by defining the security level (e.g. common criteria security level required for handling this data, secret level clearance, strictly company confidential, subject to NDA . . . ), as well as the data sharing needs and rules (users, printers, beamers . . . ) in accordance with the project needs and corporate IT security practices. A local GraphGuard agent user interface client may be used to this on the data creator or importer device D0. As long as the data remains within the security domain managed by a GraphGuard control server CS1 (for instance the Corporate IT domain or a domain under supervision by a Security Operations Center in a critical infrastructure cybersecurity environment), storage and communications enforcement rely upon domain-dependent security tools (such as PGP and VPN in the corporate IT world or various NIST, IEC and ISO standards in the automation industry), in association with good practices rules and enforcement. The creation of new nodes and edges in a GraphGuard graph managed by the control server CS1 can be transparent to the end users as long as they are compliant with the security rules as initially associated with the graph. When unauthorized communications are requested later on by the same or another user on the same or another device, this is detected by the GraphGuard server as an illicit transaction request. Further user interaction is then required to relax the data conformance level, if allowed (for instance after expiration of a confidentiality obligation classification) and the graph may be adapted accordingly.

Figure 4:
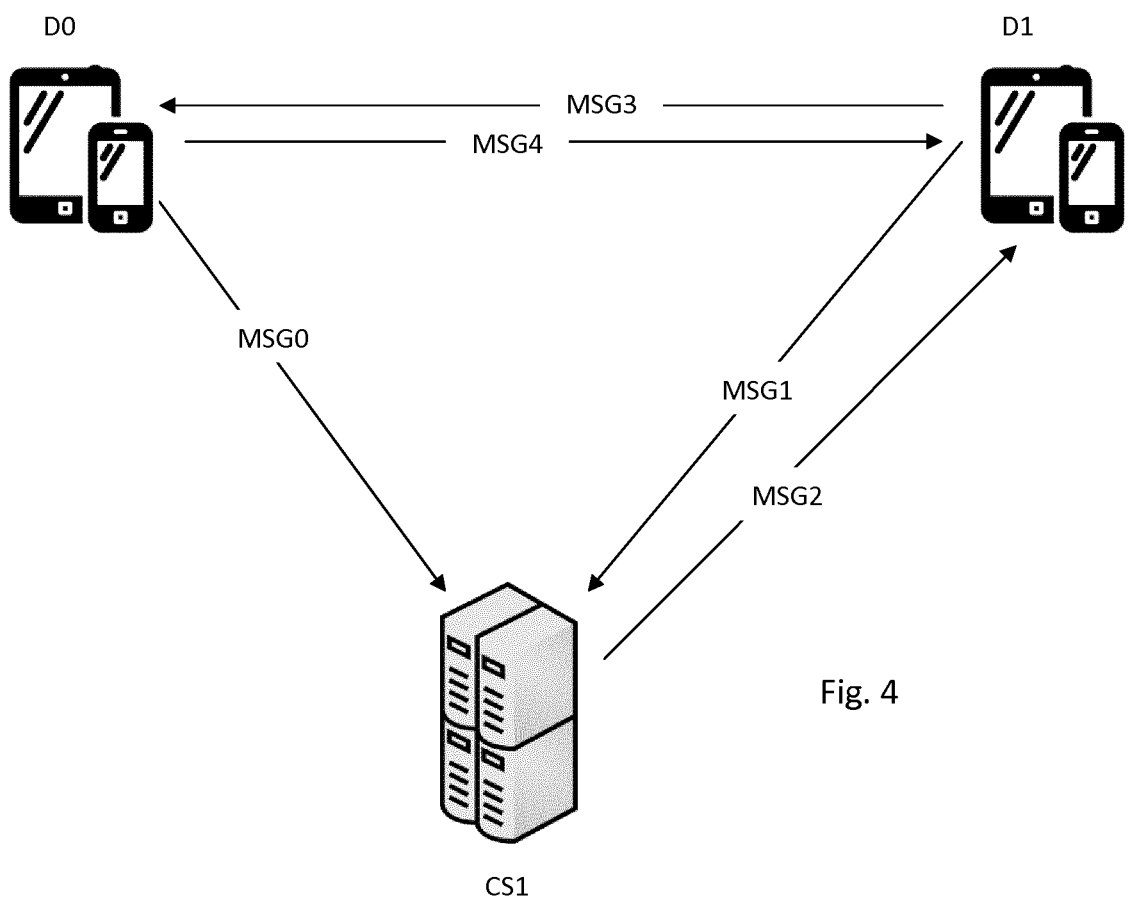
FIG. 4 illustrates one example of the transactions with the server.

In the FIG. 4, we have illustrated one example of the transactions with the server. The first message MSG0 sent by the first device D0 to the server CS1 comprises the first device identification and the data management section of the first data set. The latter contains the data identifier. Considering that the server receives for the first time this data management section, the server creates in its database, a graph data set comprising a common section, edges and nodes. The first node is filled with the first device identification and the common section is filled with the data usage information.

The second step is the reception of a request to access the data set. According to the example illustrated in the FIG. 4, the second device D1 sends a message MSG1 to the server CS1 to obtain the authorization to access the data set. This message comprises the second device identification and the identification of the data set. At the reception of this message, the server CS1 can retrieve the graph data set of the corresponding data set using the data identifier. The data usage information defines the security conformance level that the second device should fulfil. According to this specific example the server CS1 comprises a database identifying the conformance level of the second device. With the second device identifier, the server can determine to which group of devices this second device belongs. The second device identifier can have a first section describing the family of devices (e.g. Android 4.2, IOS 6.9) and a second section identifying individually the device. With the first section, the server can retrieve the security conformance level of the second device.

The server then compares the retrieved security conformance level with the one stored in the common section of the data set. If the retrieved security conformance level is equal or higher than the one stored in the common section, the authorization is granted, otherwise, the server refuses the transfer of the data set.

If the authorization is granted, a message MSG2 is sent to the requestor, in our case the second device D1. According to one embodiment, this message comprises a signature on the second device identifier and the data set identifier, signed by the server private key. This signature is then sent to the first device D0 (message MSG3) by the second device D1. The first device D0 checks the authenticity of the signature with the public key of the server and if the authenticity is recognized by the first device, the data set is sent from the first device D0 to the second device D1 (message MSG4).

The tracking server CS1 stores in the graph data set corresponding to the data set (as identified by the data identifier), the second device D1 identifier as a new node. The transaction from device D0 to device D1 is stored as an edge.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities.

Although an overview of the inventive subject matter has been described with reference to specific example embodiments, various modifications and changes may be made to these embodiments without departing from the broader spirit and scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method to track dissemination of a first data set by a first tracking server, a first device, and a second device, wherein the first data set includes at least a data management section and a data payload, and wherein the data management section includes at least a data identifier and data usage information defining at least a security conformance level, the method comprising:
receiving, by the first tracking server, from the first device, a first device local data and at least a data management section of a first set of data, wherein the data management section includes at least a security conformance level and a first data identifier;
identifying or creating in the database, a current graph data set corresponding to the first data identifier, wherein the current graph data set includes a common section, edges, and nodes;
storing the current graph data set such that the first data management section is in the common section and the first identifier is a first node;
receiving by the first tracking server a request to transfer the first data set from the first device to the second device, wherein the request includes at least a second device local data of the second device and the first data identifier;
retrieving by the first tracking server a second device security conformance level, based on the second device local data;
verifying by the first tracking server that the second device security conformance level meets the security conformance level of the first data set as identified by the first data identifier;
in a positive event, responding by granting authorization to the transfer of at least the data payload of the first data set to the second device;
recording in the database, in correspondence with the current graph data set, the second device local data as a second graph data node; and
recording in the database, in correspondence with the current graph data set, a transaction from the first device to the second device as an edge in the current graph data set linking the first graph node and the second graph node.

2. The method of claim 1, wherein the local data of the first device and the second device is identification data identifying the device.

3. The method of claim 1, wherein the local data of the first device and the second device is localization data identifying a geographic location of the device.

4. The method of claim 1, wherein the request is initiated by the first device, the second device receiving the data payload of the first data set from the first device.

5. The method of claim 1, wherein the request is initiated by the second device, the second device receiving the data payload of the first data set from the first device.

6. The method of claim 1, wherein the request is initiated by the first device, the second device receiving, from the first device, an address of a service provider storing the data payload, the current graph data set being updated with a new node with the identification of the service provider.

7. The method of claim 1, wherein the data payload is protected by cryptographic means, the authorization received by the second device including the cryptographic means to access to the data payload.

8. The method of claim 1, wherein the first tracking server is connected to a second tracking server, the method comprising:
after the reception of the first data identifier from the first device, requesting the second tracking server if a graph data set exists in relation with the first data identifier, and in the positive event;
updating in the first tracking server the graph data set related to the first data identifier with the graph data set received from the second tracking server.

9. The method of claim 1, wherein the edge of the graph data set includes the date and time of the transaction.

10. A tracking server to track propagation of a data set comprising:
at least a data management section and a data payload, wherein the data management section includes at least a data identifier and data usage information defining at least a security conformance level,
wherein the server is coupled to a database storing at least a graph data set identified by a data identifier, and
wherein the graph data set includes a common section, edges and nodes, the server being configured to:
receive, from the first device, a first device local data and at least a data management section of a first set of data, wherein the data management section includes at least the security conformance level and a first data identifier;
identify or create in the database, a current graph data set corresponding to the first data identifier;

store, in the current graph data set, the first data management section in the common section and the first device local data as a first node;

receive a request to transfer the first data set from the first device to a second device, the request including at least a second device local data of the second device;

retrieve second device security conformance level, based on the second device local data;

verify that the second device security conformance level meets the security conformance level of the first data set;

in a positive event, respond by granting authorization to the transfer of the first data set to the second device;

record in the database, in respect with the current graph data set, the second device local data as a second graph data node; and record in the database, in correspondence with the current graph data set, a transaction from the first device to second device as an edge in the graph data set linking the first graph node and the second graph node.

11. The tracking server of claim 10, wherein the local data of the first and second device is localization data identifying a geographic location of the device, and wherein the tracking server includes a representation module to generate a geographical dissemination map of the data set representing the node and the edge according to the localization of the devices.

12. The tracking server of claim 10, further comprising connection with a second tracking server, the tracking server being configured to:

after the reception of the first data identifier from the first device, request the second tracking server when a graph data set exists in relation with the first data identifier, and in the positive event, update the current graph data set related to the first data identifier in its database with the graph data set received from the second tracking server.

13. The tracking server according to claim 10, wherein the data payload is protected by cryptographic means, wherein the server is configured to send to the second device the cryptographic means allowing access to the data payload.

14. A non-transitory computer readable medium comprising instructions that when executed by a processing device, cause the processing device to:

receive, by a first tracking server, from a first device, a first device local data and at least a data management section of a first set of data, wherein the data management section includes at least a security conformance level and a first data identifier to track the dissemination of a first data set by a first tracking server, a first device, and a second device, the data set includes at least a data management section and a data payload, the data management section includes at least a data identifier and data usage information defining at least a security conformance level;

obtain in the database, a current graph data set corresponding to the first data identifier, wherein the current graph data set includes a common section, edges, and nodes;

store in the current graph data set, wherein the first data management section in the common section and wherein the first identifier as a first node;

receive by the first tracking server a request to transfer the first data set from the first device to the second device, wherein the request includes at least a second device local data of the second device and the first data identifier;

retrieve by the first tracking server second device security conformance level, based on the second device local data;

verify, by the first tracking server, that the second device security conformance level meets the security conformance level of the first data set as identified by the first data identifier;

in a positive event, respond by granting authorization to the transfer of at least the data payload of the first data set to the second device;

record in the database, in respect with the current graph data set, the second device local data as a second graph data node; and record, in the database in respect with the current graph data set, a transaction from the first device to the second device as an edge in the current graph data set linking the first graph node and the second graph node.

15. The non-transitory computer readable medium of claim 14, wherein the local data of the first device and the second device is identification data identifying the device.

16. The method of claim 1, wherein the request is initiated by the first device, the second device receiving the data payload of the first data set from the first device.

17. The non-transitory computer readable medium of claim 14, wherein the request is initiated by the second device, the second device receiving the data payload of the first data set from the first device.

18. The non-transitory computer readable medium of claim 14, wherein the request is initiated by the first device, the second device receiving, from the first device, an address of a service provider storing the data payload, the current graph data set being updated with a new node with the identification of the service provider.

19. The non-transitory computer readable medium of claim 14, wherein the data payload is protected by cryptographic means, the authorization received by the second device including the cryptographic means to access to the data payload.

* * * * *